United States Patent
Huang et al.

(10) Patent No.: US 9,766,899 B2
(45) Date of Patent: Sep. 19, 2017

(54) BOOTLOADER CONTROL VIA DEVICE IDENTIFIER

(71) Applicant: Google Inc., Mountain View, CA (US)

(72) Inventors: Jonathan Huang, Sunnyvale, CA (US); Paul Allan Covell, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/980,658

(22) Filed: Dec. 28, 2015

(65) Prior Publication Data

US 2017/0185418 A1   Jun. 29, 2017

(51) Int. Cl.
G06F 9/445 (2006.01)
G06F 9/44 (2006.01)
G06F 3/06 (2006.01)

(52) U.S. Cl.
CPC .......... *G06F 9/4406* (2013.01); *G06F 3/0604* (2013.01); *G06F 3/0659* (2013.01); *G06F 3/0688* (2013.01); *G06F 8/63* (2013.01)

(58) Field of Classification Search
CPC .... G06F 9/4406; G06F 3/0604; G06F 3/0659; G06F 3/0688; G06F 8/63
USPC ................................................. 717/168–178
See application file for complete search history.

(56) References Cited

U.S. PATENT DOCUMENTS

| 5,325,532 A * | 6/1994 | Crosswy ............... G06F 9/4406 713/100 |
| 7,425,992 B2 | 9/2008 | Feeler et al. |
| 8,352,721 B1 * | 1/2013 | Righi .................... G06F 9/4406 713/1 |
| 9,092,233 B2 * | 7/2015 | Andrews ............... G06F 9/4416 713/2 |

(Continued)

FOREIGN PATENT DOCUMENTS

| CN | 101038551 | 9/2007 |
| CN | 101196819 | 5/2010 |
| CN | 102999422 | 3/2013 |

OTHER PUBLICATIONS

Fosler et al., "A FLASH Bootloader for PIC16 and PIC18 Devices", 2002, Microchip Technology Inc., 38 pages.*

(Continued)

*Primary Examiner* — Ted T Vo
(74) *Attorney, Agent, or Firm* — Fish & Richardson P.C.

(57) ABSTRACT

Methods, systems, and apparatus, including computer programs encoded on computer storage media, for placing a device in a bootloader state. One of the methods includes determining, during a boot process of the apparatus, whether a device of a particular type is connected to the apparatus, in response to determining that a device of the particular type is connected to the apparatus, determining a device identifier for the device, comparing the device identifier for the device with a predetermined identifier that indicates a device to which the apparatus should provide control of the boot process to determine whether the device identifier is the (Continued)

same as the predetermined identifier, and in response to determining that the device identifier is the same as the predetermined identifier, maintaining the apparatus in a bootloader state to provide control of the boot process of the apparatus to the device.

22 Claims, 3 Drawing Sheets

(56) References Cited

U.S. PATENT DOCUMENTS

2005/0079868 A1 4/2005 Shankar et al.
2006/0282652 A1 12/2006 El-Haj-mahmoud et al.

OTHER PUBLICATIONS

Microchip, "PIC18FX7J94 Plug-In Module—User's Guide", 2013, Microchip Technology Inc., 36 pages.*

"14—Disk Setup," OpenBSD, retrieved on Oct. 30, 2015, retrieved from the Internet: URL<http://www.openbsd.org/faq/faq14.html>, 36 pages.
"Android software development," from Wikipedia, the free encyclopedia, last modified on Oct. 28, 2015 [retrieved on Oct. 30, 2015]. Retrieved from the Internet: URL<https://en.wikipedia.org/wiki/Android_software_development>, 13 pages.
"Booting from USB," from LQWiki, modified on Jul. 3, 2010 [retrieved on Oct. 30, 2015]. Retrieved from the Internet: URL<http://wiki.linuxquestions.org/wiki/Booting_from_USB>, 8 pages.
"Booting," from Wikipedia, the free encyclopedia, last modified on Nov. 20, 2015 [retrieved on Nov. 24, 2015]. Retrieved from the Internet: URL<https://en.wikipedia.org/wiki/Booting>, 15 pages.
"Using Meikian Live," Meikian, 2014-2015 [retrieved on Dec. 17, 2015]. Retrieved from the Internet: URL >http://docs.meikian.eu/en/latest/usage.html>, 6 pages.
Google Git, "FastBoot Version 0.4," Google Source, retrieved on Dec. 4, 2015, retrieved from the Internet: URL<https://android.googlesource.com/platform.system/core/+/master/fastboot/fastboot_protocol.txt>, 5 pages.

* cited by examiner

BOOTLOADER CONTROL VIA DEVICE IDENTIFIER

BACKGROUND

Some computers have a boot process that is used during startup of the computer to provide support for particular features of the computer. For example, a computer may load drivers for devices connected to or included in the computer. The computer may load an operating system and applications required for the execution of the operating system.

SUMMARY

In some implementations, a device uses a device identifier to control a bootloader. The device identifier may be a Universal Serial Bus (USB) device identifier, e.g., a vendor ID and a product ID. For instance, during a boot process, a high level bootloader can detect that a particular USB device is attached to the device based on the device identifier, stop the boot up process, and flash, e.g., re-flash, the device.

In general, one innovative aspect of the subject matter described in this specification can be embodied in methods that include the actions of determining, during a boot process of the apparatus, whether a device of a particular type is connected to the apparatus, in response to determining that a device of the particular type is connected to the apparatus, determining a device identifier for the device, comparing the device identifier for the device with a predetermined identifier that indicates a device to which the apparatus should provide control of the boot process to determine whether the device identifier is the same as the predetermined identifier, and in response to determining that the device identifier is the same as the predetermined identifier, maintaining the apparatus in a bootloader state to provide control of the boot process of the apparatus to the device. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of for each of multiple boot processes of a first device determining, during the boot process, whether a device of a particular type is connected to the first device, for a first subset of the multiple boot processes in response to determining that a device of the particular type is not connected to the first device continuing the boot process of the first device, for a second subset of the multiple boot processes in response to determining that a device of the particular type is connected to the first device, the second subset mutually exclusive from the first subset determining a device identifier for the device of the particular type, comparing the device identifier for the device of the particular type with a predetermined identifier that indicates a device to which the first device should provide control of the boot process to determine whether the device identifier is the same as the predetermined identifier, and in response to determining that the device identifier is the same as the predetermined identifier, maintaining the first device in a bootloader state to provide control of the boot process of the first device to the device of the particular type. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include receiving, from the device while the apparatus is in the bootloader state, one or more commands. Providing control of the boot process of the apparatus to the device may include receiving, from the device, an application image, and installing the application image on the apparatus. Receiving, from the device, the application image may include receiving, from the device, a firmware image. Installing the application image on the apparatus may include installing the firmware image on the apparatus. An apparatus may include a random access memory. Receiving the one or more commands may include receiving a command to store contents of the random access memory in a non-volatile memory. An apparatus may include a non-volatile memory. The method may include storing the contents of the random access memory in the non-volatile memory. The method may include sending, to the device, the contents of the random access memory for storage in the non-volatile memory. Sending, to the device, the contents of the random access memory for storage in the non-volatile memory may include sending, by way of the device, the contents of the random access memory for storage on the non-volatile memory included in a second device, connected to the device.

In some implementations, determining the device identifier for the device may include determining a vendor identifier for the device and a product identifier for the device. Determining whether a device of the particular type is connected to the apparatus may include determining whether a universal serial bus device is connected to the apparatus.

In some implementations, continuing the boot process of the first device may include providing control of the boot process from a high level bootloader to a second stage bootloader. Providing control of the boot process from a high level bootloader to a second stage bootloader may include determining, by the second stage bootloader, an operating system to load on the first device. The method may include for a first group of boot processes from the second subset in response to determining that the device identifier is not the same as the predetermined identifier continuing the boot process of the first device. Maintaining the first device in the bootloader state to provide control of the boot process of the first device to the device of the particular type may include for a second group of boot processes from the second subset in response to determining that the device identifier is the same as the predetermined identifier, the second group mutually exclusive from the first group maintaining the first device in a bootloader state to provide control of the boot process of the first device to the device of the particular type. The method may include determining whether the device identifier is the same as the predetermined identifier in response to comparing the device identifier for the device of the particular type with the predetermined identifier.

The subject matter described in this specification can be implemented in particular embodiments and may result in one or more of the following advantages. In some implementations, a developer or an end user may use the systems and methods described below to provision, e.g., flash, or reset a device. For example, a user can plug a USB dongle, e.g., with a read only memory, a device identifier, and a USB circuit, into a device, e.g., an embedded device, to provision or reset the device. In some implementations, the use of a device identifier to control or halt a boot process may allow a user to update firmware, an operating system, or both, on a device during a software development process or when a software update is available without manual configuration of the device by the user for the update, e.g., without manual selection of a button or control. In some implementations, the use of a device identifier to control or halt a boot process may allow a user to recover a device when software on the device does not work correctly, e.g., by replacing the software with updated software. For example, when a user creates a firmware version that does not allow a device to operate correctly, e.g., load an operating system, the user may place an updated version of the firmware on a connectable device to allow a device to determine an identifier for the connectable device, determine that the identifier is a predetermined identifier, and allow the connectable device to control a boot process, e.g., a bootloader state, on the device, e.g., to copy the new firmware to the device. In some implementations, the systems and methods described below may minimize the use of cables in an automated test environment, may minimize implementation cost, might not require any specialized connectors for implementation, might not require physical cable swapping or reconfiguration to restore a device to operation, or two or more of these.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A device determines, during a boot process, an identifier of a connected device. If the identifier matches a predetermined identifier, e.g., stored in a memory of the device, the device maintains a particular state in a bootloader. The bootloader may be a high level bootloader, e.g., that does not load an operating system and transfer operation of the device to the operating system. In some examples, the high level bootloader may be a bootloader that transfers operation of the device to a second stage bootloader when a connected device with a predetermined identifier is not connected to the device.

When the identifier for the connected device is the same as the predetermined identifier, the device may retrieve data from the connected device to allow the connected device to reset the device, to flash a file system of the device, or both. In some examples, the device may maintain the bootloader state to allow the connected device to send commands to the device, e.g., debugging commands. The device may respond to the commands by sending data to the connected device. For instance, the device may allow a developer to analyze properties of the device, using the connected device, as part of a software development process. The device may connect to the connected device using a cable, e.g., a Universal Serial Bus (USB) cable or audio cable, or a wireless connection, e.g., WiFi, Bluetooth, or near field communication (NFC), to name a few examples.

Figure 1:
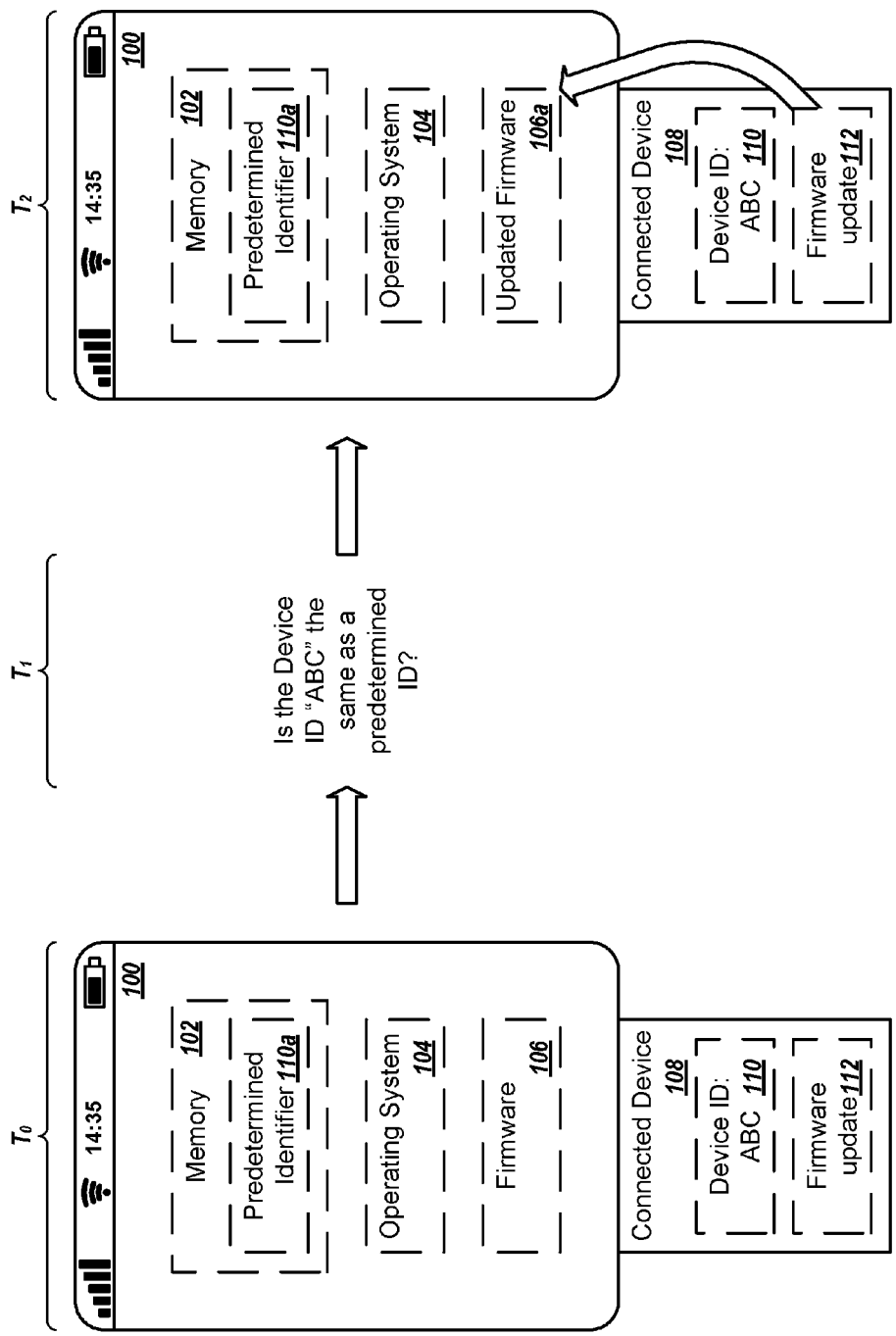
FIG. 1 shows an example device.

FIG. 1 shows an example device 100 that includes a memory 102, an operating system 104, and firmware 106. The device 100 may be an embedded system. In some examples, the device 100 may be a smart phone. The device 100 may be any appropriate type of computer.

The memory 102 may include instructions for the operating system 104, the firmware 106, or both. In some examples, the device 100 may include multiple memories as the memory 102. For instance, the device 100 may include a first memory that stores the instructions for the firmware 106 and a second memory that stores the instructions for the operating system 104. The first memory may be smaller than the second memory.

During time $T_0$, the device 100 determines that a connected device 108 is connected to the device 100 while the device 100 is performing part of a boot process. For instance, the connected device 108 may be connected to the device 100 before time $T_0$, e.g., by a user. The device 100 is powered on after the connected device 108 is connected to the device 100 and the device 100 begins a boot process. During the boot process, during time $T_0$, the device 100 determines that the connected device 108 is connected to the device 100.

The device 100 may perform a portion of the boot process in which the device 100 loads drives for components integrated into the device 100. The device 100 may load a USB driver or a driver for an audio jack and determine that the connected device 108 is connected to the device, e.g., in response to loading the driver for the connected device 108.

The device 100 requests a device identifier from the connected device 108. For instance, in response to determining that the connected device 108 is connected to the device 100, the device 100 may determine that the connected device 108 is of a particular type, e.g., from which the device 100 may receive commands during a boot process. The device 100 may request the device identifier from the connected device 108 in response to determining that the connected device 108 is connected to the device 100 or that the connected device 108 is of the particular type.

The connected device 108 retrieves a device identifier 110 from memory. The device identifier may include two or more different values. For instance, the device identifier may be a combination of a vendor identifier, e.g., for a vendor that manufactures or designed the connected device 108, and a product identifier, e.g., an identifier for the particular model created by the vendor. The connected device 108 may use any appropriate information as part of the device identifier 110 that uniquely identifies the connected device 108, e.g., a media access control address, or a type of device, e.g., a particular model created by a specific vendor.

The device 100 receives the device identifier 110 from the connected device 108, e.g., via cable or wireless connection, and compares the device identifier 110 with a predetermined identifier 110a. For instance, the device 100 may retrieve the predetermined identifier 110a from the memory 102 or another memory.

The device 100, at time $T_1$, compares the device identifier 110 with the predetermined identifier 110a to determine whether the two identifiers are the same. For example, the device 100 compares the alphanumeric characters in the device identifier 110 with the alphanumeric characters in the predetermined identifier 110a to determine whether the two identifiers are the same. Each of the identifiers may contain any appropriate values.

In response to determining that the device identifier 110 and the predetermined identifier 110a are the same, the device 100, during time $T_2$, provides control of the device 100 or the boot process to the connected device 108. For instance, the device 100 halts the boot process and enters a state in which the device 100 waits for a command from the connected device 100. The device 100 may send a message to the connected device 108 indicating that the device 100 is waiting for a command from the connected device 108.

The device 100 receives a command from the connected device 108. For example, the command may indicate that the device 100 will receive a firmware update 112 from the connected device 108 and that the device 100 should install the firmware update 112, e.g., to create updated firmware 106a.

The device 100 receives the firmware update 112 from the connected device 108 and installs the firmware update. The firmware update may replace all or a portion of the firmware 106 to create the updated firmware 106a.

The device 100 may be configured to receive data from, provide data to, or both, the connected device 108 in response to providing the connected device 108 with control of the boot process. For example, the device 100 may receive an update to the operating system 104, the firmware 106, or other data stored in the memory 102. In some examples, the device 100 may receive a command to store data from a volatile memory of the device 100 into a non-volatile memory, e.g., for later analysis such as debugging. In some implementations, the device 100 may store data from the volatile memory in another volatile memory, e.g., of another device.

The device 100 may receive a command from the connected device 108 instructing the device 100 to load and execute an operating system stored on the connected device 108. The operating system may allow the connected device 108 to re-flash the device 100, e.g., to install new firmware or update existing firmware. For instance, the connected device 108 and the device 100 may connect. While the connected device 108 and the device 100 are connected, the connected device 108 polls the device 100 until the device 100 responds. The device 100 may determine that the device identifier 110 and the predetermined identifier 110a are the same. In response to determining that the device identifier 110 and the predetermined identifier 110a are the same, the device 100 indicates that the device 100 is ready to receive commands from the connected device 108. The device 100 may send a message to the connected device 108 indicating that the device 100 is ready to receive a command or may clear a bit to indicate that the device 100 is ready to receive a command, to name a few examples. The connected device 108 can then send a command or multiple commands to the device 100. For example, the connected device 108 may use a protocol, such as fastboot, to send commands to the device 100.

In some examples, the device 100 may receive debugging commands from the connected device 108 or another device. For instance, the connected device 108 may be a USB cable that attaches the device 100 to a workstation. When the device 100 determines that the identifier for the connected device 108 is the same as the predetermined identifier, the device 100 allows the connected device 108, and the workstation, to control the boot process for the device 100. The device 100 may receive one or more debugging commands from the workstation, via the USB cable, and execute corresponding instructions in response to receipt of the commands or determine data responsive to the commands and provide the determined data to the workstation.

The workstation may present a user interface to a user that allows the user to enter, select, or both, commands that the workstation sends to the device 100. The workstation receives the commands and provides the commands to the device 100, e.g., with instructions for the device 100 to execute the command. The workstation may present the user interface on a monitor, e.g., separate from the device 100, and may receive the commands from an input device, e.g., a keyboard, mouse, or speech input device. The input device may be a separate device from the device 100.

The workstation may receive responses from the device 100 and present information from the responses in the user interface. For instance, responses may include debugging information which the workstation presents in the user interface or analyzes to determine a problem in an application that executed on the device 100, e.g., the operating system 104 or the firmware 106. The workstation may store some or all of the data from the responses in a memory, e.g., for use during analysis of the data.

In some examples, when the device 100 executes an operating system received from the connected device 108 or the workstation, the device 100 provides the connected device 108 or the workstation with a remote terminal, executing on the device 100, that allows a user to provide the commands directly to the device 100, e.g., using the connection for the remote terminal. In some implementations, the workstation may be part of the connected device 108, e.g., the connected device may present a user interface to the user.

In some implementations, the device 100 is connected to the connected device 108 during time $T_0$. For instance, as part of a boot process, the device 100 may load drivers for a wireless connection, e.g., WiFi, Bluetooth, or NFC, and connect to the connected device 108 at substantially the same time that the device 100 determines that the connected device 108 is connected to the device. The device 100 may use any appropriate method to connect to the connected device 108.

In some implementations, the device 100 may wait for a command from the connected device 108 until a command is received, at which time the device 100 analyzes the command to determine an action to perform. In some implementations, the device 100 waits for a predetermined period of time until the connected device 108 sends a command to the device 100, e.g., maintains the bootloader state until the command is received. Upon termination of the predetermined period of time, the device 100 may resume the boot process. For example, the high level bootloader may continue the boot process and may pass control of the device 100 to a second stage bootloader. In some implementations, the device 100 maintains the bootloader state until a command is received from the connected device 108 or an input included in the device 100, e.g., until the device 100 determines that a power button to turn the device 100 off has been selected.

Figure 2:
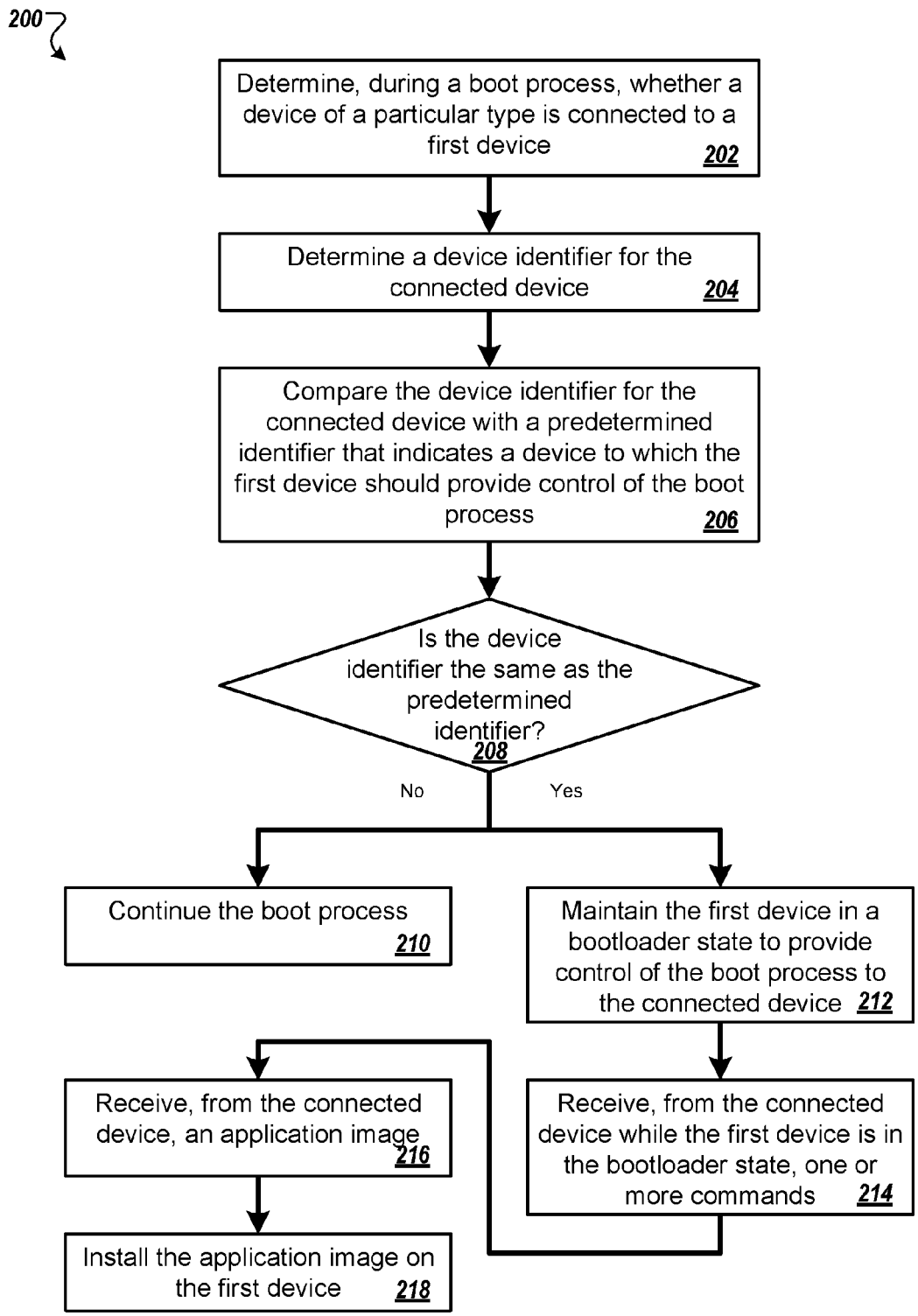
FIG. 2 is a flow diagram of a process for maintaining a first device in a bootloader state to provide control of the first device's boot process to a connected device.

FIG. 2 is a flow diagram of a process 200 for maintaining a first device in a bootloader state to provide control of the first device's boot process to a connected device. For example, the process 200 can be used by the device 100 shown in FIG. 1.

A first device determines, during a boot process, whether a device of a particular type is connected to a first device (202). For instance, the first device receives input indicating a selection of a power button and initiates a boot process, e.g., the first device turns on and initiates the boot process. As part of the boot process, the first device loads drivers for other types of devices and determines whether a device of the particular type is connected to the first device.

In some examples, the first device may determine that the connected device is of the particular type based on the drivers currently or recently loaded during the boot process. For instance, the first device may load a USB driver, determine that the connected device is connected to the first device, and, in response to the loading and the determination, determine that the connected device is a USB device.

The first device determines a device identifier for the connected device (204). For example, the first device sends a message to the connected device that requests the device identifier. In some examples, the message may request two or more identifiers that the first device may use as the device identifier to determine whether the connected device is of the particular type. The first device receives a response from the connected device that includes the device identifier for the connected device.

The first device compares the device identifier for the connected device with a predetermined identifier that indicates a device to which the first device should provide control of the boot process (206). The first device determines whether the device identifier the same as the predetermined identifier (208). When the first device receives two identifiers, the first device combines the two identifiers in a particular order and compares the combined identifier with the predetermined identifier. In some examples, the first device may compare each of the separate identifiers received from the connected device with corresponding predetermined identifiers. In these examples, if each of the predetermined identifiers is the same as the corresponding identifier received from the first device, the first device provides control of the boot process to the connected device.

In response to determining that the device identifier is not the same as the predetermined identifier, the first device continues the boot process (210). The first device does not pass control of the boot process to the connected device, e.g., does not pass control of a high level boot process to the connected device. The first device may continue to load device drivers. The first device, e.g., a high level bootloader, may pass control of the first device to a second stage bootloader which loads an operating system and passes control of the first device to the operating system. The first device may load drivers for all potential types of connected devices before passing control of the first device to the second stage bootloader, e.g., from the high level boot loader.

In some examples, the second stage bootloader may determine whether data for the second stage bootloader identifies the connected device as a potential device with an operating system for the first device to load. The second stage bootloader may determine whether there are multiple operating systems from which to select and present a menu to a user in response to determining that there are multiple operating systems from which to select, e.g., to allow the user to select one of the operating systems.

In response to determining that the device identifier is the same as the predetermined identifier, the first device maintains a bootloader state to provide control of the boot process to the connected device (212). For instance, the first device halts the boot process. The first device maintains the bootloader state of the high level bootloader and waits for a command from the connected device.

The first device receives, from the connected device while the first device is in the bootloader state, one or more commands (214). The first device may receive a command instructing the first device to receive data from the connected device, e.g., a firmware update, an operating system update, or both. The first device may receive a debugging command from the connected device, e.g., to store data from memory, either volatile or non-volatile, in a location for use during a debugging process.

The first device receives, from the connected device, an application image (216). In some examples, the first device may receive a command indicating that the first device will receive an application image from the connected device. The application image may be a firmware update or an operating system update.

The first device installs the application image on the first device (218). For instance, the first device receives a command to install the application image after receiving the application image. The first device may receive a command to reboot after installation of the application image is complete.

In some implementations, the process 200 can include additional steps, fewer steps, or some of the steps can be divided into multiple steps. For example, the first device may perform steps 202 through 208 and 212 without performing steps 210 and 214 through 218.

In some examples, the first device may perform some of the steps of the process multiple times. For instance, the first device may perform steps 202 through 208 during each boot process and determine, using the result of the determination whether the device identifier is the same as the predetermined identifier, whether to continue the boot process or maintain the first device in the bootloader state, e.g., the high level bootloader state.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 3:
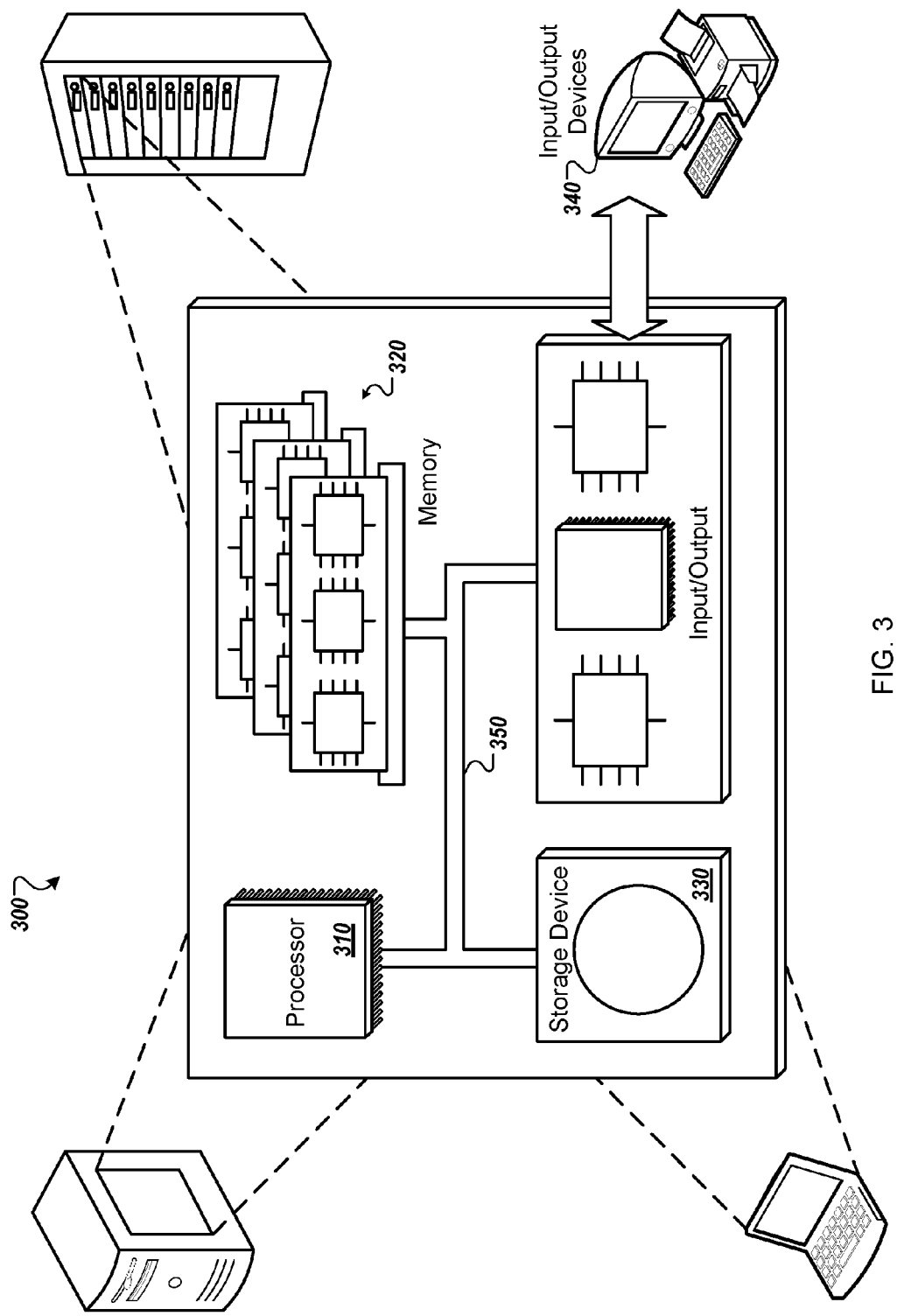
FIG. 3 is a block diagram of a computing system that can be used in connection with computer-implemented methods described in this document.

An example of one such type of computer is shown in FIG. 3, which shows a schematic diagram of a generic computer system 300. The system 300 can be used for the operations described in association with any of the computer-implemented methods described previously, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. An apparatus comprising:
   a data processing apparatus; and
   a non-transitory computer readable storage medium in data communication with the data processing apparatus and storing instructions executable by the data processing apparatus and upon such execution cause the data processing apparatus to perform operations comprising:
   automatically determining, for three or more executions of a boot process of the apparatus and during the respective boot process of the apparatus, whether a device is connected to the apparatus;
   in response to determining that a device is connected to the apparatus, determining, for each of the three or more executions of a boot process, whether a type of the device is a particular type;
   for at least a first execution and a second execution of the three or more executions of the boot process and in response to determining that the type of the device is of the particular type:
   determining, for each of the two or more executions of a boot process that include the first execution and the second execution, a device identifier for the device;
   comparing, for each of the two or more executions of a boot process, the device identifier for the device with a predetermined identifier that indicates a device to which the apparatus should provide control of the boot process to determine whether the device identifier is the same as the predetermined identifier;
   for at least the first execution of the two or more executions of the boot process and in response to determining that the device identifier is the same as the predetermined identifier, maintaining the apparatus in a bootloader state to provide control of the boot process of the apparatus to the device; and
   for at least the second execution of the two or more executions of the boot process and in response to determining that the device identifier is not the same as the predetermined identifier, continuing the boot process of the apparatus; and
   for at least a third execution of the three or more executions in response to determining that the type of the device is not the particular type, continuing the boot process of the apparatus.

2. The apparatus of claim 1, the operations comprising receiving, from the device while the apparatus is in the bootloader state, one or more commands.

3. The apparatus of claim 2, wherein providing control of the boot process of the apparatus to the device comprises:
   receiving, from the device, an application image; and
   installing the application image on the apparatus.

4. The apparatus of claim 3, wherein:
   receiving, from the device, the application image comprises receiving, from the device, a firmware image; and
   installing the application image on the apparatus comprises installing the firmware image on the apparatus.

5. The apparatus of claim 2, comprising:
   a random access memory, wherein receiving the one or more commands comprises receiving a command to store contents of the random access memory in a non-volatile memory.

6. The apparatus of claim 5, comprising:
   the non-volatile memory, the operations comprising storing the contents of the random access memory in the non-volatile memory.

7. The apparatus of claim 5, the operations comprising sending, to the device, the contents of the random access memory for storage in the non-volatile memory.

8. The apparatus of claim 7, wherein sending, to the device, the contents of the random access memory for storage in the non-volatile memory comprises sending, by way of the device, the contents of the random access memory for storage on the non-volatile memory included in a second device, connected to the device.

9. The apparatus of claim 1, wherein determining the device identifier for the device comprises determining a vendor identifier for the device and a product identifier for the device.

10. The apparatus of claim 1, wherein determining whether a device of the particular type is connected to the apparatus comprises determining whether a universal serial bus device is connected to the apparatus.

11. The apparatus of claim 1, wherein continuing the boot process of the apparatus comprises loading drivers for one or more additional particular types of devices.

12. The apparatus of claim 1, wherein determine a device identifier for the device comprises:
generating a request for the device identifier for the device;
transmitting, to the device, the request for the device identifier for the device; and
receiving, from the device, a response to the request for the device identifier for the device.

13. The apparatus of claim 1, comprising:
loading drivers for only devices of the particular types prior to automatically determining whether a device is connected to the apparatus, wherein:
determining whether a type of the device is a particular type comprises determining whether the type of the device is a particular type based on drivers for particular types of devices that were loading during the current boot process.

14. A non-transitory computer readable storage medium storing instructions executable by a data processing apparatus and upon such execution cause the data processing apparatus to perform operations comprising:
automatically determining, for three or more executions of a boot process of a first device and during the respective boot process of the first device, whether a second device is connected to the first device;
in response to determining that a second device is connected to the first device, determining, for each of the three or more executions of a boot process, whether a type of the second device is a particular type;
for at least a first execution and a second execution of the three or more executions of the boot process and in response to determining that the type of the second device is the particular type:
determining, for each of the two or more executions of a boot process that includes the first execution and the second execution, a device identifier for the second device;
comparing, for each of the two or more executions of a boot process, the device identifier for the second device with a predetermined identifier that indicates a device to which the first device should provide control of the boot process to determine whether the device identifier is the same as the predetermined identifier;
for at least the first execution of the two or more executions of the boot process and in response to determining that the device identifier is the same as the predetermined identifier, maintaining the first device in a bootloader state to provide control of the boot process of the first device to the second device; and
for at least the second execution of the two or more executions of the boot process and in response to determining that the device identifier is not the same as the predetermined identifier, continuing the boot process of the first device; and
for at least a third execution of the three or more executions in response to determining that the type of the second device is not the particular type, continuing the boot process of the first device.

15. The computer readable storage medium of claim 14, the operations comprising:
receiving, from the second device while the first device is in the bootloader state, one or more commands.

16. The computer readable storage medium of claim 15, wherein providing control of the boot process of the first device to the second device comprises:
receiving, from the second device, an application image; and
installing the application image on the first device.

17. The computer readable storage medium of claim 16, wherein:
receiving, from the second device, the application image comprises receiving, from the second device, a firmware image; and
installing the application image on the first device comprises installing the firmware image on the first device.

18. A computer-implemented method comprising:
for each of multiple boot processes of a first device:
determining, during the boot process, whether a device of a particular type is connected to the first device;
for a first subset of the multiple boot processes in response to determining that a device of the particular type is not connected to the first device:
continuing the boot process of the first device;
for a second subset of the multiple boot processes in response to determining that a device of the particular type is connected to the first device, the second subset mutually exclusive from the first subset:
determining a device identifier for the device of the particular type;
comparing the device identifier for the device of the particular type with a predetermined identifier that indicates a device to which the first device should provide control of the boot process to determine whether the device identifier is the same as the predetermined identifier; and
in response to determining that the device identifier is the same as the predetermined identifier, maintaining the first device in a bootloader state to provide control of the boot process of the first device to the device of the particular type.

19. The method of claim 18, wherein continuing the boot process of the first device comprises providing control of the boot process from a high level bootloader to a second stage bootloader.

20. The method of claim 19, wherein providing control of the boot process from a high level bootloader to a second stage bootloader comprises determining, by the second stage bootloader, an operating system to load on the first device.

21. The method of claim 18, comprising:
for a first group of boot processes from the second subset in response to determining that the device identifier is not the same as the predetermined identifier:
continuing the boot process of the first device, wherein maintaining the first device in the bootloader state to provide control of the boot process of the first device to the device of the particular type comprises:
for a second group of boot processes from the second subset in response to determining that the device identifier is the same as the predetermined identifier, the second group mutually exclusive from the first group:
maintaining the first device in a bootloader state to provide control of the boot process of the first device to the device of the particular type.

22. The method of claim 18, comprising:
determining whether the device identifier is the same as the predetermined identifier in response to comparing the device identifier for the device of the particular type with the predetermined identifier.

* * * * *